United States Patent [19]

Scribano

[11] Patent Number: 4,665,542
[45] Date of Patent: May 12, 1987

[54] SPOT FILM DEVICE LEVELING MECHANISM

[75] Inventor: Frank C. Scribano, Western Springs, Ill.

[73] Assignee: The Machlett Laboratories, Inc., Stamford, Conn.

[21] Appl. No.: 759,791

[22] Filed: Jul. 29, 1985

[51] Int. Cl.$^4$ .......................................... G03B 42/02
[52] U.S. Cl. .................................................. 378/176
[58] Field of Search ...................... 378/176, 175, 167; 51/99

[56] References Cited

U.S. PATENT DOCUMENTS

| 2,966,588 | 12/1960 | Kizaur | 378/176 X |
| 3,641,709 | 2/1972 | Gazuit | 51/99 X |
| 3,862,426 | 1/1975 | Thomas | 378/176 X |
| 3,916,203 | 10/1975 | Norgren | 378/176 |
| 4,190,774 | 2/1980 | Marinkovich et al. | 378/176 |
| 4,412,401 | 11/1983 | Fundell | 51/99 X |

Primary Examiner—Frederick R. Schmidt
Assistant Examiner—Steven P. Schad
Attorney, Agent, or Firm—Richard M. Sharkansky

[57] ABSTRACT

An X-ray table having a surface disposed in a plane defined by longitudinal and transverse axes and a column extending perpendicularly to such axes. The column includes a plurality of vertical tracks. A carriage is provided supporting a spot film device projecting over the table surface. The carriage comprises a plurality of bearing assemblies, corresponding to the plurality of tracks, for slidably mounting the carriage on the plurality of tracks of the column. Each bearing assembly comprises: a bearing plate mounted about a pivot point to a surface of the carriage; and, a plurality of opposing bearings rotatably mounted to the bearing plate and arranged to engage the corresponding one of the plurality of tracks on the column. Application of lateral force to the bearing plate of a first one of the bearing assemblies pivots the carriage about the pivot point of that bearing plate. Likewise, application of lateral force to the bearing plate of a second one of the bearing assemblies pivotes the carriage about the pivot point of that bearing plate. Thus, with such arrangement, the carriage is gimballed with respect to the column about the bearing assembly pivot points. The pivot points of the first and second bearing assemblies are disposed along the transverse and longitudinal axes, respectively. Hence the carriage, and the spot film device secured thereto, may be pivoted about the carriage with two degrees of freedom to level the spot film device with respect to the table surface along the longitudinal and transverse axes.

3 Claims, 5 Drawing Figures

SPOT FILM DEVICE LEVELING MECHANISM

BACKGROUND OF THE INVENTION

This invention relates generally to X-ray tables and more particularly to apparatus for leveling spot film devices for X-ray tables.

As is known, a conventional X-ray table comprises a table body having a top surface and supporting a tower. The tower is supported on guide tracks on the table so that the tower may slide along the longitudinal axis of the table. The tower typically is equipped with vertical guide tracks along which a carriage is slidably mounted. Bearings carried by the carriage allow the carriage to move vertically along the tower tracks. The purpose of the carriage is to provide support for a spot film device. The spot film device projects over the table and is equipped with a set of horizontal tracks which engage a set of bearings within the carriage. Thus, the spot filmer can be displaced horizontally along the transverse axis of the table.

In order for the X-ray table to perform properly, the spot film device must be level with respect to the table. That is, the spot film device and the table surface must lie in parallel planes. The spot film device must, therefore, be disposed parallel to both the longitudinal and transverse axes of the table. One apparatus used in the art provides leveling along the transverse axis by permitting adjustment of the position of the carriage bearings engaged by the spot film device. Each track on the spot film device lies on two pairs of opposing bearings carried by the carriage. The position of one bearing of each of the opposing pairs of bearings is adjustable, such as by an eccentric axle. Thus, the angle at which the spot film device slides along the carrier, and hence the angle between the spot film device and the table surface may be adjusted by altering the position of the adjustable carriage bearings.

While the above-described spot film device leveling apparatus functions satisfactorily in some applications, there are problems associated therewith. First, the apparatus provides leveling with respect to the transverse axis of the table, but does not allow the spot film device to be leveled along the longitudinal axis of the table. Further, the amount of leveling adjustment that can be achieved by altering the position of the carriage bearings is limited. Thus, it is possible that tranverse leveling of very heavy spot film devices might not be achieved by the above-described prior art apparatus.

SUMMARY OF THE INVENTION

In accordance with the present invention, an X-ray table is provided having a surface. The X-ray table comprises a column extending perpendicularly to the surface. A carriage is mounted on the column and a spot film device is supported by the carriage, the spot film device projecting over the surface of the table. The carriage comprises gimballing means for pivoting the carriage with two degrees of freedom leveling the spot film device with respect to the surface. With such arrangement, leveling of the spot film device is provided along both axes of the X-ray table surface and therefore the spot film device is maintained parallel to the surface, allowing for more accurate X-ray imaging.

In a preferred embodiment of the invention, an X-ray table is provided having a surface disposed along a longitudinal axis and a transverse axis. The X-ray table comprises a column extending perpendicularly to the surface with respect to the longitudinal and transverse axes. A carrier is pivotally mounted to the column about the longitudinal axis and about the transverse axis. The carrier comprises means for leveling an object, such as a spot film device secured to the carriage, with respect to the surface along both the transverse and longitudinal axes. The leveling means comprises: a first set of adjusting screws mechanically coupled to the column for pivoting the carriage with respect to the column about the transverse axis; and, a second set of adjusting screws mechanically coupled to the column for pivoting the carriage with respect to the column about the longitudinal axis. With this arrangement, leveling is provided in both the longitudinal and transverse axes. Further, the leveling adjustment capability of such apparatus exceeds that of an X-ray table which relies on altering the position of the carriage bearings on which the spot film device slides on the carriage. Thus, the present invention is capable of leveling even heavy spot film devices.

BRIEF DESCRIPTION OF THE DRAWINGS

The invention and the foregoing features thereof may be fully understood from the following detailed description read in conjunction with the accompanying drawings, wherein.

DESCRIPTION OF THE PREFERRED EMBODIMENT

Figure 1:
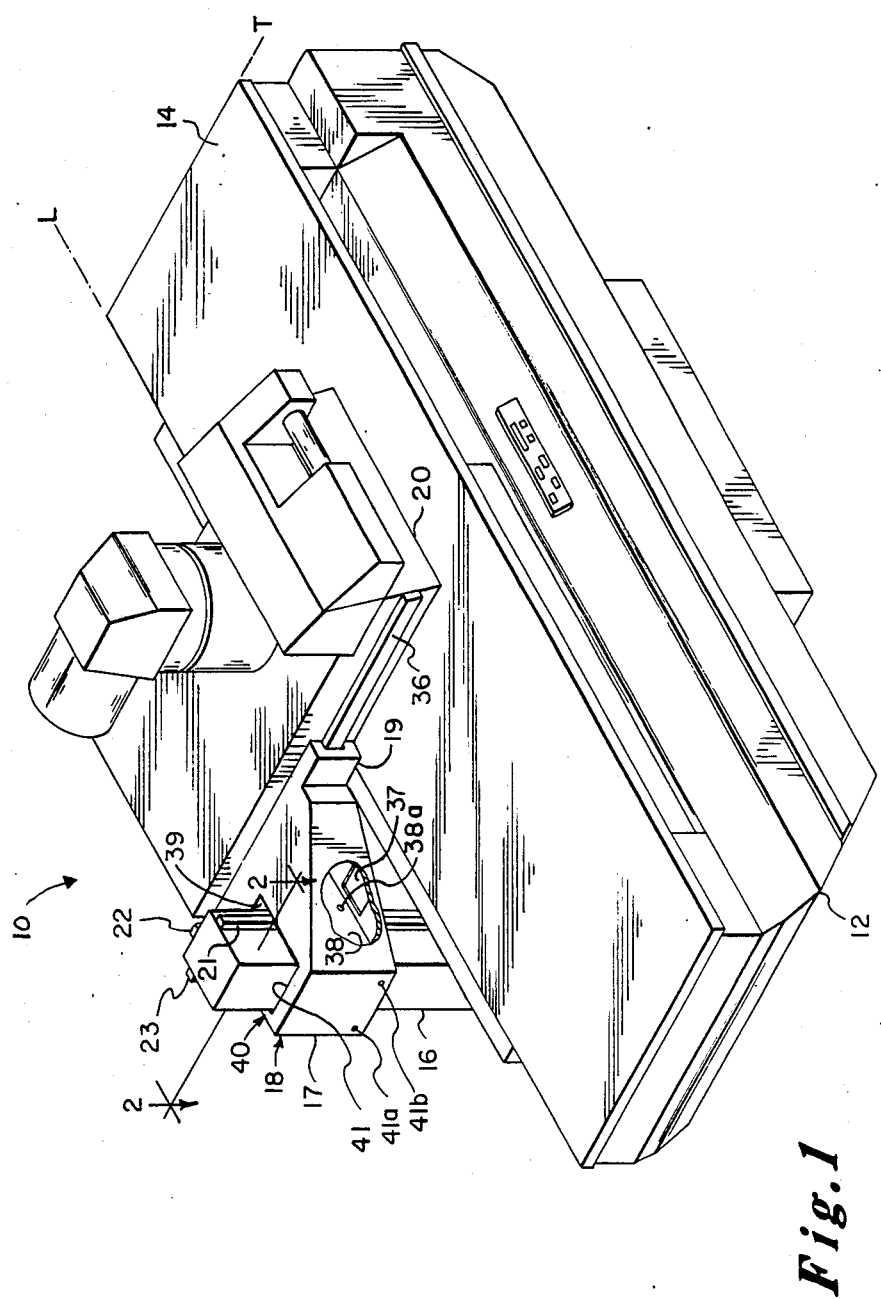
FIG. 1 is an isometric view of an X-ray table embodying the spot film device leveling mechanism of the present invention.
Figure 2:
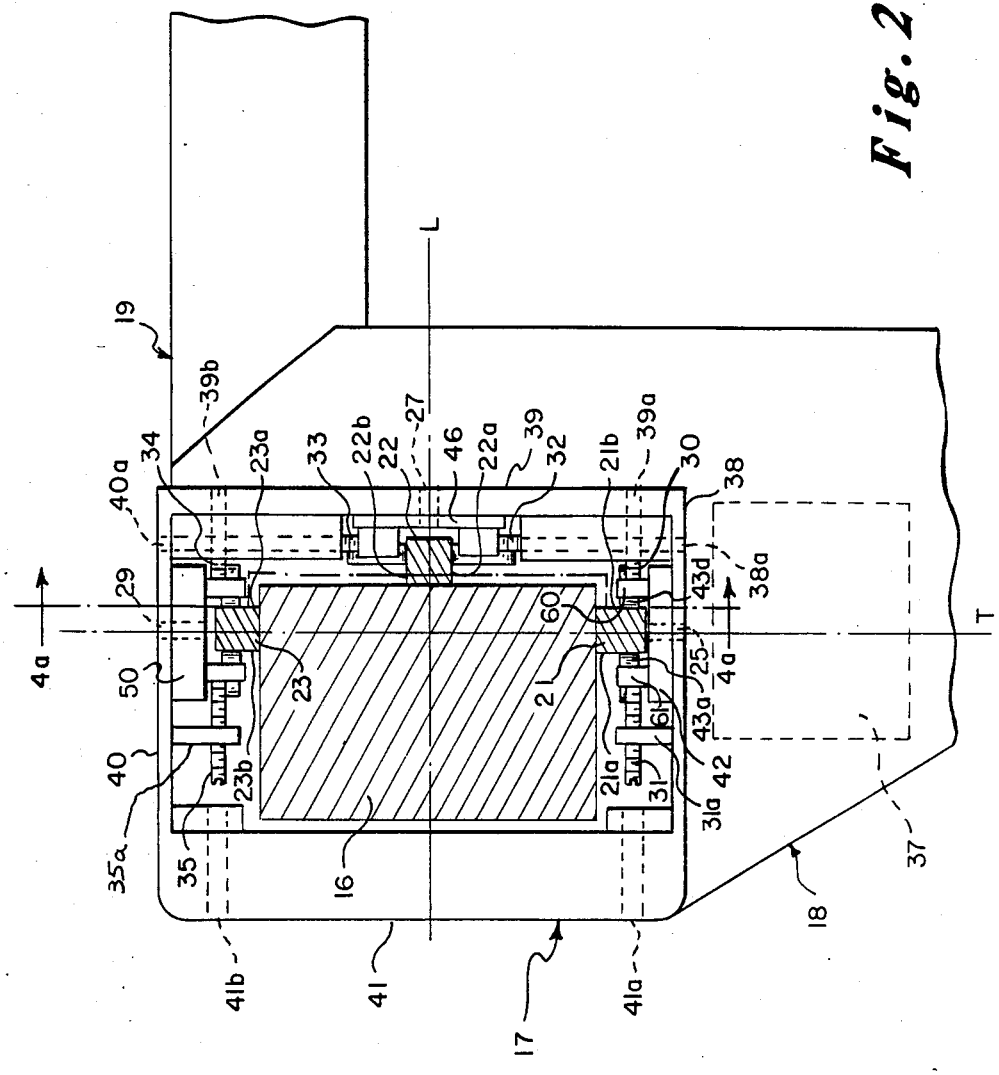
FIG. 2 is a cross-sectional view taken along line 2—2 of FIG. 1 illustrating the leveling mechanism of the present invention.
Figure 3:
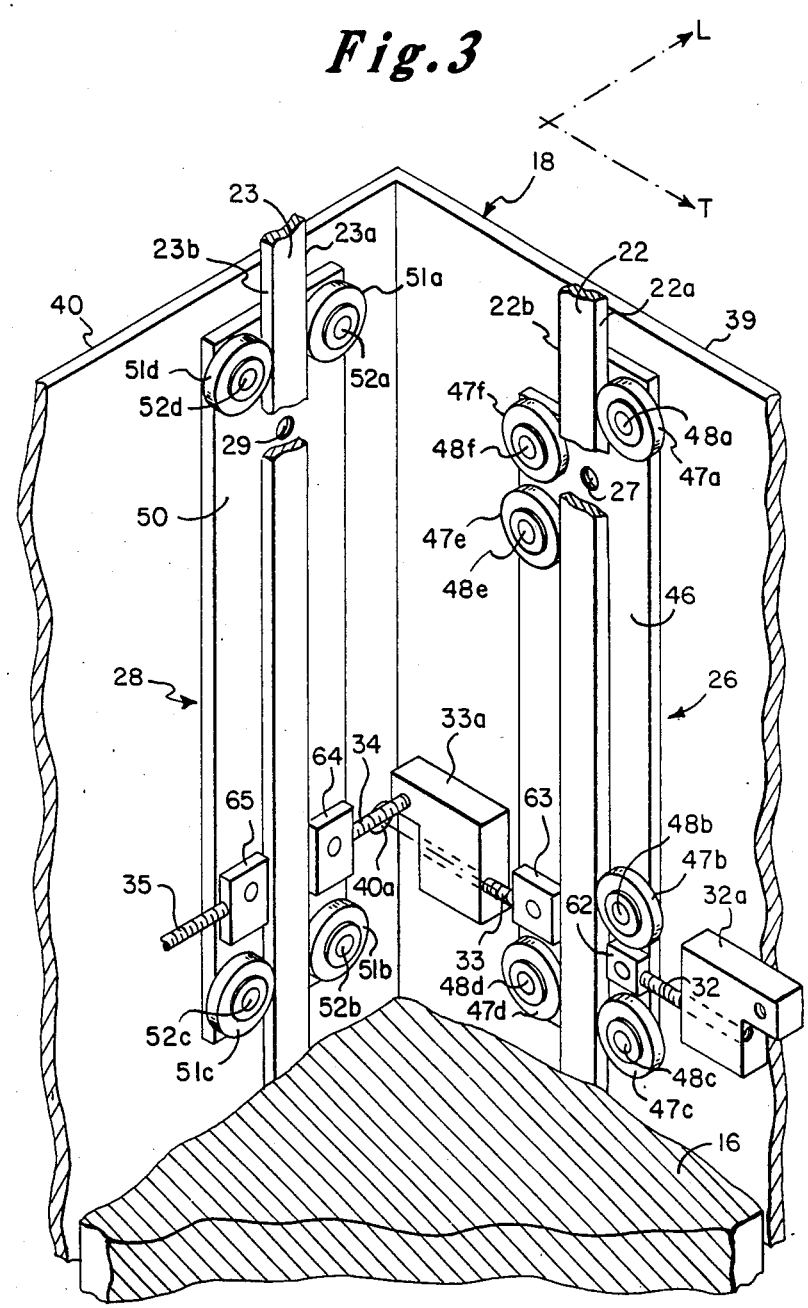
FIG. 3 is an isometric and cross-sectional view from FIG. 2 of walls 39, 40 of carriage 18 with tower 16 broken away, and further illustrating the leveling mechanism of the present invention.

Referring to FIGS. 1-3, the spot film device leveling mechanism of the present invention and the X-ray table embodying the same are shown. X-ray table 10 comprises a body member 12 on which is disposed table surface 14. Table surface 14 is generally horizontal and lies in a plane defined by the longitudinal axis L of the table (running along a length of the table) and the transverse axis T of the table (running along the width of the table). Such two axes are orthogonal. Body member 12 supports tower 16 which is a column extending vertically to the surface 14 perpendicularly to the longitudinal and transverse axes of the table. The tower is slidably mounted to the table by conventional means (not shown) so that the tower may slide along the longitudinal axis L of the table. Tower 16 slidably supports carriage 18. Carriage 18 comprises tower engaging section 17 and support section 19. Spot film device 20 is slidably mounted on support section 19 of carriage 18 in a conventional manner along a pair of horizontal tracks 36 (only one being shown in FIG. 1). Vertical tracks 21, 22, 23 are secured to three sides of tower 16. Each track 21, 22, 23 comprises a pair of opposing slots 21a, 22b, 22a, 22b, 23a, 23b, respectively, adapted for receiving and guiding bearings carried by carriage 18 on bearing assemblies 24, 26, 28 in a manner to be described. Suffice it here to say that tower engaging section 17 of carriage 18 is slidably mounted on tower 16 by the engagement of carriage bearing assemblies 24, 26, 28 with the opposing slots of tracks 21, 22, 23, respectively. In order to provide proper operation of X-ray table 10, the present invention provides leveling of spot film device 20 with respect to the surface 14 along both the transverse T and longitudinal L axes. That is, the present invention allows spot film device 20 to be adjusted to be parallel to surface 14. Briefly, this is accomplished in the present invention by altering the position of carriage 18 on tower 16 using load bearing adjusting screws 30, 32, 34, respectively, and back-up adjusting screws 31, 33, 35, respectively. Carriage 18 comprises bearing assemblies 24, 26, 28, each pivotally mounted to the inner walls 38, 39, 40 of carriage 18 about support pivots (i.e. pivot points) 25, 27, 29, respectively. Each bearing assembly 24, 26, 28 is pivotally fixed with respect to tower 16 due to the engagement of bearing assemblies 24, 26, 28 with tower tracks 21, 22, 23, respectively. Adjusting screws 30-35, secured to carriage 18, exert lateral force against bearing assemblies 24, 26, 28, causing carriage 18 to pivot about support pivots 25, 27, 29. Such pivoting changes the angle at which carriage 18 is positioned on tower 16 and, hence, varies the angle between spot film device 20 and surface 14. By properly adjusting screws 30-35, spot film device 20 can be leveled in both the transverse T and longitudinal L axes to be precisely parallel to surface 14 of X-ray table 10.

Referring now to FIGS. 2 and 3, tower engaging section 17 of carriage 18 is shown in detail. It is seen that tower engaging section 17 comprises walls 38-41 arranged to form a housing through which tower 16 passes. Walls 38-40 pivotally support bearing assemblies 24, 26, 28, which slide along corresponding tower tracks 21, 22, 23. Walls 39, 40 and corresponding assemblies 26, 28 are shown in detail in FIG. 3. Wall 38, which is disposed opposing wall 40 (FIG. 1), carries bearing assembly 24. Bearing assemblies 24, 28 are of substantially identical construction.

Bearing assembly 26 comprises bearing plate 46 pivotally mounted at a first end thereof by support pivot 27 to wall 39 of tower engaging section 17. Support pivot 27 comprises a rounded metal member welded to bearing plate 46 and engaging carriage wall 39 through an opening disposed therein. Bearing plate 46 supports a plurality (here six) of opposing bearings 47a-47f on corresponding axles 48a-48f. Six bearings are provided in bearing assembly 26 because bearing assembly 26 provides the only leveling adjustment for spot film device 20 with respect to transverse axis T, as can be seen from FIG. 2. Bearings 47a-47c are supported along a first edge of bearing plate 46, while a second, opposing edge of bearing plate 46 provides support for bearings 47d-47f. Bearings 47a-47c are parallel to bearings 47d-47f and are spaced therefrom to allow tower track 22 to slide between said parallel sets of bearings. Bearings 47a-47c engage slot 22a of track 22 and opposing slot 22b thereof guides bearings 47d-47f.

Bearing assemblies 24, 28 are identical in construction, with bearing assembly 28 being shown in detail in FIG. 3. Bearing assembly 24 comprises bearing plate 42 pivotally mounted at a first end thereof to wall 38 by support pivot 25. Support pivot 25 comprises a rounded metal member welded to bearing plate 42 and engaging carriage wall 38 through an opening disposed therein. Bearing plate 42 supports a plurality, here four, of opposing bearings 43a-43d on corresponding axles 44a-44d (bearings 43b, 43c not being shown). Bearings 43a, 43b are disposed on a first edge of bearing plate 42 and bearings 43c and 43d are mounted on a second, opposing edge of bearing plate 42. The space between bearings 43a, 43b and 43c, 43d is selected to allow bearings 43a, 43b to ride in slot 21a of tower track 21 and bearings 43c, 43d to be guided in opposing slot 21b thereof. Thus, it is seen that bearings 43a-43d rotate about axles 44a-44d generally parallel to bearing plate 42 and along slots 21a, 21b of tower track 21. Bearing assembly 28 comprises bearing plate 50 pivotally mounted at a first end thereof to wall 40 of carriage 18 by support pivot 29. Support pivot 29 comprises a rounded metal member welded to bearing plate 50 and engaging carriage wall 40 through an opening disposed therein. Bearings 51a, 51b are supported along a first edge of bearing plate 50 by axles 52a, 52b. Axles 52c, 52d support bearings 51c, 51d along a second, opposing edge of bearing plate 50. Bearings 51a, 51b oppose bearings 51c, 51d with bearings 51a, 51b rotating about axles 52a, 52b along slot 23a of tower track 23. Bearings 51c, 51d rotate along opposing slot 23b about axles 52c, 52d, respectively. Thus, it is seen that tower engaging section 17 of carriage 18 is slidably mounted to tower 16 by the engagement of tower tracks 21, 22, 23 by the opposing bearings of bearing assemblies 24, 26, 28, respectively.

Figure 4B:
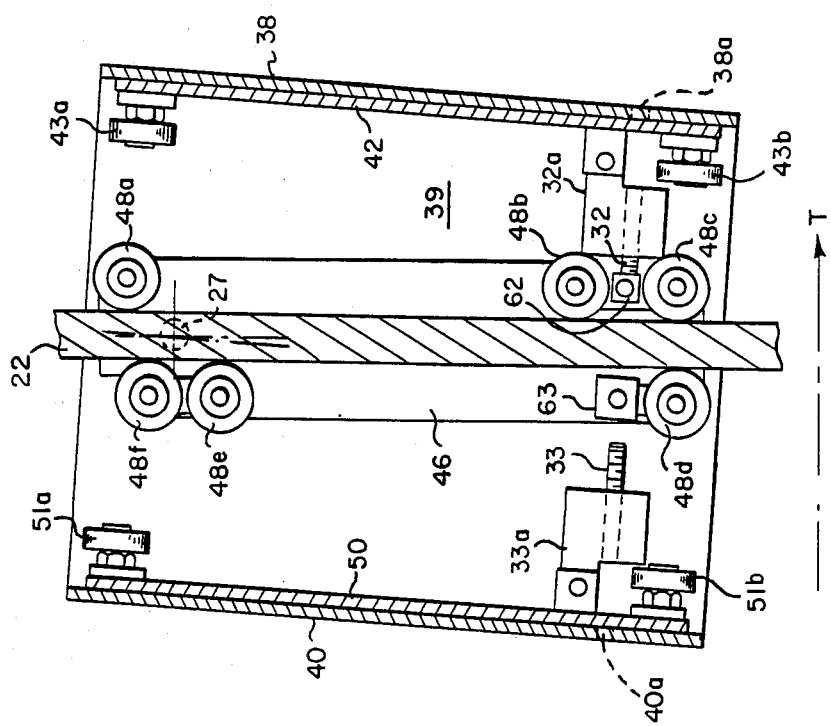
FIGS. 4a, 4b, are cross-sectional and plane views taken along line 4—4 of FIG. 2 and illustrating an operational feature of the leveling mechanism of the present invention.
Figure 4A:
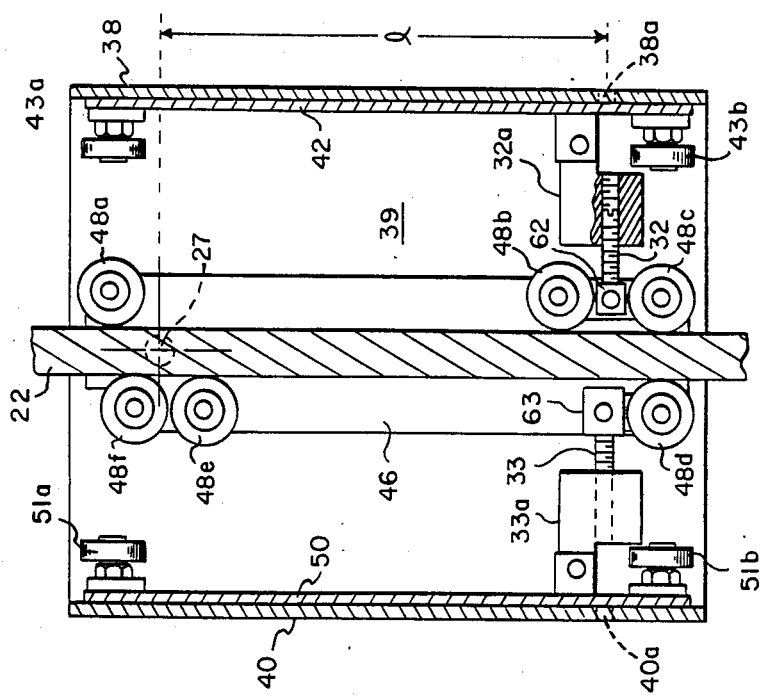

Each bearing assembly 24, 26, 28 is vertically suspended from the support pivot 25, 27, 29 thereof, and is nominally positioned to be perpendicular to the longitudinal L and transverse T axes of X-ray table 10. Bearing assemblies 24, 26, 28 comprise means for engaging bearing plates 42, 46, 50 at second ends thereof with a lateral force to produce a torque about support pivots 25, 27, 29. Since each bearing plate 42, 46, 50, is rotationally fixed along tower tracks 21, 22, 23, such produced torque forces carriage 18 to pivot with respect to tower 16 about support pivots 25, 27, 29. Thus, the angle made by carriage 18 (and hence spot film device 20) with the longitudinal L and transverse T axes is altered. Bearing assembly 26 comprises stops 62, 63, disposed on bearing plate 46 at a second end thereof. Stop 62 is mounted on the first edge of bearing plate 46, with the second edge thereof supporting stop 63. Referring also to FIGS. 4a, 4b, it is seen that stops 62, 63 are vertically spaced from support pivot 27 by a distance 1, such spacing being necessary to allow a torque to be developed about support pivot 27 in response to the exertion of lateral force against stops 62, 63 in a manner to be described by adjustment screws 32, 33, respectively. Load-bearing-adjustment screw 32 threadably engages bracket 32a, secured to carriage wall 39. Likewise, backup-adjustment screw 33 threadably engages bracket 33a which is also secured onto carriage wall 39. The terminal ends of screws 32, 33 strike stops 62, 63, respectively, on bearing plate 46. The head of load-bearing-adjustment screw 32 is accessed by opening 38a in carriage wall 38 via aperture 38a in tower engaging section 17. Opening 40a in carriage wall 40 provides access for the head of backup-adjustment screw 33. Bearing assembly 28 likewise comprises stops 64, 65 disposed on opposing edges of bearing plate 46 at a second end thereof. Stops 64, 65 are vertically spaced from support pivot 29 by a distance 1 for the reasons recited above. Stop 64 is engaged by the terminal end of load-bearing-adjustment screw 34, which is threadably mounted to bracket 33a, as shown. The terminal end of backup-adjustment screw 35 strikes stop 65, as shown. Backup-adjustment screw 35 is threadably mounted to bracket 35a, which is secured to carriage wall 40. The head of load-bearing-adjustment screw 34 is accessed via opening 39b in carriage wall 39. Opening 41b in wall 41 provides access for the head of backup-adjustment screw 35. Bearing assembly 24 is constructed identically to bearing assembly 28 in this regard. Thus, bearing plate 42 thereof supports stops 60, 61 at a second end thereof, displaced by a distance 1 from support pivot 25. Stop 60 is disposed on the first edge of bearing plate 42, with the second edge thereof providing support for stop 61. Stop 60 is engaged by the terminal end of load-bearing-adjustment screw 30, such screw being threadably mounted in bracket 32a. Backup-adjustment screw 31 is threadably mounted on bracket 31a, which is secured onto carriage wall 38. The terminal end of such screw engages stop 61. The head of load-bearing-adjustment screw 30 is accessed through opening 39a in carriage wall 39. Opening 41a in carriage wall 41 provides access to the head of backup-adjustment screw 31.

Bearing assemblies 24, 26, 28 each operate in a similar manner to pivot carriage 18 about tower 16. The operation of bearing assembly 26 is illustrative and may be completely understood by referring to FIGS. 4a and 4b, which show bearing assembly 26 pivotally mounted to carriage wall 39 and engaging tower track 22. FIG. 4a shows carriage wall 39 (and hence carriage 18) in a nominal position with respect to track 22, and FIG. 4b illustrates the pivoting of carriage wall 39 with respect to tower track 22, and hence tower 16, by the adjustment of screws 32, 33. In the nominal position shown in FIG. 4a, carriage 18 is mounted on tower 16 without spot film device 20. Thus, the only weight on tower 16 is the weight of carriage 18. Adjusting screws 32, 33 are set to strike stops 62, 63 of bearing plate 46 and maintain bearing plate 46 parallel to carriage walls 38, 40 to thereby maintain carriage walls 38, 40 parallel to tower track 22. Carriage 18 is thus parallel to transverse axis T. When spot film device 20 is mounted on carriage 18, weight is added to the tower. A little thought reveals that the added weight exerts additional force on load bearing adjustment screw 32. Since spot film device 20 extends over surface 14, the weight of spot film device 20 tends to tilt carriage 18, and hence spot film device 20, downward about longitudinal axis L with respect to tower 16. Thus, spot film device 20 makes an acute angle with transverse axis T rather than being level with transverse axis T, as shown in FIG. 4b. The amount of tilt with respect to transverse axis T is exaggerated in FIG. 4b for clarity. Spot film device 20 is leveled with respect to transverse axis T by pivoting carriage 18 and hence spot film device 20 with respect to tower 16 and about longitudinal axis L. As shown in FIG. 3, support pivot 27 is disposed along longitudinal axis L. Thus, bearing assembly 26 is pivotally mounted to carriage wall 39 about longitudinal axis L. The weight of spot film device 20 exerts force against load-bearing-adjustment screw 32, but not against backup-adjustment screw 33. Thus, backup screw 33 may be freely adjusted away from stop 63. Load-bearing-adjustment screw 32 is then rotated inwardly to exert lateral force against stop 62 and hence against bearing plate 42. Bearing plate 42 is restricted from pivoting about support pivot 27 in response to the lateral force due to the engagement of opposing bearings 47a-47f with tower track 22. Thus, bearing assembly 26 is pivotally fixed with respect to tower 16. Hence, the lateral force exerted by load-bearing-adjustment screw 32 against fixed bearing plate 46 forces carriage 18 to pivot about support pivot 27, and hence about longitudinal axis L. To put it another way, the lateral force exerted against bearing plate 46 by the adjustment of load-bearing-adjustment screw 32 is translated into a torque about support pivot 27, such torque being a function of the length 1 between support pivot 27 and stop 62. The torque forces carriage 18 to rotate about support pivot 27 (and hence longitudinal axis L) on tower 16. Hence, by sufficiently adjusting load-bearing screw 32, carriage 18 is pivoted on tower 16 about longitudinal axis L sufficiently to make carriage 18, and hence spot film device 20, level with respect to the transverse axis T of table surface 14. When adjustment of screw 32 is complete, backup-adjustment screw 33 is rotated to again engage stop 63. This prevents inadvertent pivoting of carriage 18 about longitudinal axis L and support pivot 27 in response to spurious forces such as the vibration of table 10. Pivoting can further be prevented by securing bearing plate 46 to carriage wall 39 with bolts (not shown).

Bearing assemblies 24, 28 function in a similar manner to pivot carriage 18 on tower 16 about the transverse axis T and thus adjust spot film device 20 to be parallel to longitudinal axis L of table 10. The weight of spot film device 20 tends to tilt carriage 18 and spot film device 20 downward toward table 14. Thus, spot film device 20 makes an acute angle with longitudinal axis L rather than being parallel to (i.e. level with) longitudinal axis L and surface 14. Backup-adjustment screw 31 is rotated away from stop 61 on bearing plate 42. Likewise, backup-adjustment screw 35 is adjusted to back the terminal end thereof away from stop 65 on bearing plate 50. Since neither backup-adjustment screw supports any weight, adjustment of such screws does not itself alter the pivotal position of carriage 18 on tower 16. Load-bearing-adjustment screws 30, 34 are then adjusted inwardly to exert lateral force against stops 60, 64 of bearing plates 42, 50. Bearing plates 42, 50 are restrained from pivoting about support pivots 25, 29 thereof due to the respective engagement of bearings 43a-43d with tower track 21 and bearings 51a-51d with tower track 23. Bearing assemblies 24, 28 are thus pivotally fixed with respect to tower 16. The lateral force exerted against bearing plates 42, 50 by load-bearing-adjustment screws 30, 34 forces carriage 18 to pivot about support pivots 25, 29. As can be seen from FIGS. 1 and 3, support pivots 25, 29 are aligned along transverse axis T; thus carriage 18 pivots about transverse axis T in response to the lateral force exerted on bearing plates 42, 50 by the adjustment of load-bearing-adjustment screws 30, 34. As discussed, such lateral force generates a torque, here about support pivots 25, 29 (and hence about transverse axis T), such torque being a function of the vertical length 1 between support pivots 25, 29 and stops 60, 64, respectively. The torque forces carriage 18 (and hence spot film device 20 secured thereto) to rotate about pivots 25, 29 (and hence about transverse axis T). Load-bearing-adjustment screws 30, 34 are adjusted by whatever amount is necessary to reduce the acute angle made by spot film device 20 with longitudinal axis L of surface 14 to zero. At such time, spot film device 20 is level with surface 14 along longitudinal axis L. When the adjustment of screws 30, 34 is complete, backup-adjustment screws 31, 35 are rotated to again engage stops 61, 65 on bearing plates 42, 50, respectively. This prevents inadvertent pivoting of carriage 18 about transverse axis T in response to spurious forces such as vibration of table 10. Pivoting may further be prevented by securing bearing plates 42, 50 to carriage walls 38, 40 with bolts (not shown).

Thus, it is seen that the present invention provides a gimballing mechanism comprising positioning assemblies 24, 26, 28 for pivoting carriage 18 about tower 16 with two degrees of freedom. That is, carriage 18 may be pivoted on tower 16 about longitudinal axis L and transverse axis T. Thus, spot film device 20 may be precisely adjusted to be parallel to, and level with, surface 14 in both the longitudinal axis L and transverse axis T by the adjustment of load-bearing-adjustment screws 30, 32, 34. Thus, it is seen that the present invention provides leveling of spot film device 20 along the two orthogonal axes of table surface 14. In addition, leveling is achieved by adjusting carriage 18 with respect to tower 16 rather than relying on the relatively minor adjustment available between the spot film device 20 and carriage 18 described in the Background of the Invention section.

Finally, it is manifest that the present invention provides for leveling adjustment in the event that spot film device 20 is replaced with a spot film device of different weight. For example, if a spot film device of lesser or greater weight were substituted for spot film device 20, less or more downward force would be exerted on support section 19 of carriage 18 and the new spot film device may not be level with respect to the surface 14 along the longitudinal axis L or the transverse axis T. The new spot film device may be adjusted to be parallel to the longitudinal axis L by loosening the backup screws 31, 35, and rotating load-bearing-adjustment screws 30, 34 so that such screws back away or push against stops 60, 64 of bearing plates 42, 50, respectively. The assembly comprising carriage 18 and the new spot film device thus pivots about the transverse axis T (i.e. support pivots 25, 29) with respect to tower 16. The adjustment is continued until the spot film device is leveled with respect to surface 14 along longitudinal axis L. Then, backup-adjustment screws 31, 35 are adjusted inwardly to engage stops 61, 65 on bearing plates 42, 50, respectively, and thereby prohibit carriage 18 from further pivoting about support pivots 25, 29. The spot film device is leveled along the transverse axis T by loosening backup screw 33 and backing or advancing load-bearing-adjustment screw 32 away from or towards stop 62 of bearing plate 46. This pivots carriage 18, and hence the spot film device, about longitudinal axis L (i.e. support pivot 27) with respect to tower 16 until the spot film device is parallel to transverse axis T. Backup-adjustment screw 33 is rotated inwardly to engage bearing plate 46 via stop 63. As discussed, bearing assemblies 24, 26, 28 are then secured to carriage walls 38, 39, 40, respectively, by bolts (not shown) to prevent carriage 18 from further pivoting about support pivots 25, 27, 29, respectively.

Having described a preferred embodiment of the present invention, modifications and alterations may become apparent to those skilled in the art. Accordingly, it is understood that the scope of the present invention is to be limited only by the appended claims.

What is claimed is:

1. An X-ray table having a surface disposed in a plane defined by a longitudinal axis and a transverse axis, the X-ray table comprising:

a column extending perpendicularly from the surface with respect to the longitudinal and transverse axes;
a carriage pivotally mounted to the column about the longitudinal axis and about the transverse axis, the carriage comprising means for leveling an object secured to the carriage with respect to the surface along both the longitudinal and transverse axes;
said leveling means comprising: a first set of adjusting screw means for reacting against the column and pivoting the carriage about the transverse axis; and, a second set of adjusting screw means for reacting against the column and pivoting the carriage about the longitudinal axis.

2. An X-ray table comprising:

a column extending vertically from a surface of the X-ray table, the column having a plurality of tracks disposed vertically thereon, each track having a pair of opposing slots adapted to receive opposing bearings;
carriage means for supporting a member over the surface of the X-ray table, said carriage means comprising a plurality of bearing assemblies for slidably mounting the carriage means on the corresponding tracks of the column;
each bearing assembly comprising: a bearing plate mounted to the carriage means about a pivot point; and, a plurality of opposing bearings, each bearing being rotatably mounted to the bearing plate on an axle, said opposing bearings engaging the opposing slots of a corresponding track on the column; and
means for generating a torque about the pivot point of each bearing assembly pivoting said carriage means about the column.

3. An X-ray table having a surface disposed along a longitudinal axis and a transverse axis, the X-ray table comprising:

a column extending perpendicularly to the longitudinal and transverse axes, the column comprising a plurality of tracks disposed vertically thereon, each one of the plurality of tracks disposed vertically thereon, each one of the plurality of tracks comprising a pair of opposing slots adapted to receive opposing bearings, a first one of the plurality of tracks being arranged to align the opposing slots thereof with the longitudinal axis and a second one of the plurality of tracks being arranged to align the opposing slots thereof with the transverse axis;
carriage means for supporting a spot film device over the surface of the X-ray table, said carriage means comprising a plurality of bearing assemblies, corresponding to the plurality of tracks, for slidably mounting the carriage means on the plurality of tracks of the column;
wherein each bearing assembly comprises: a bearing plate mounted about a pivot point to a surface of the carriage means; and, a plurality of opposing bearings, each one of the opposing bearings being rotatably mounted to the bearing plate by an axle, said plurality of opposing bearings being arranged to engage the opposing slots of the corresponding track on the column; and
said carriage means comprising means for exerting lateral force against the bearing plate associated with the first one of the plurality of tracks pivoting the carriage means about the transverse axis, and means for exerting lateral force against the bearing plate associated with the second one of the plurality of tracks pivoting the carriage means about the longitudinal axis.

* * * * *